Feb. 3, 1925.　　　　　　　　　　　　　　　　　　　1,524,886
J. F. ROBERTS
FRUIT CUTTER AND PITTER
Filed May 26, 1924
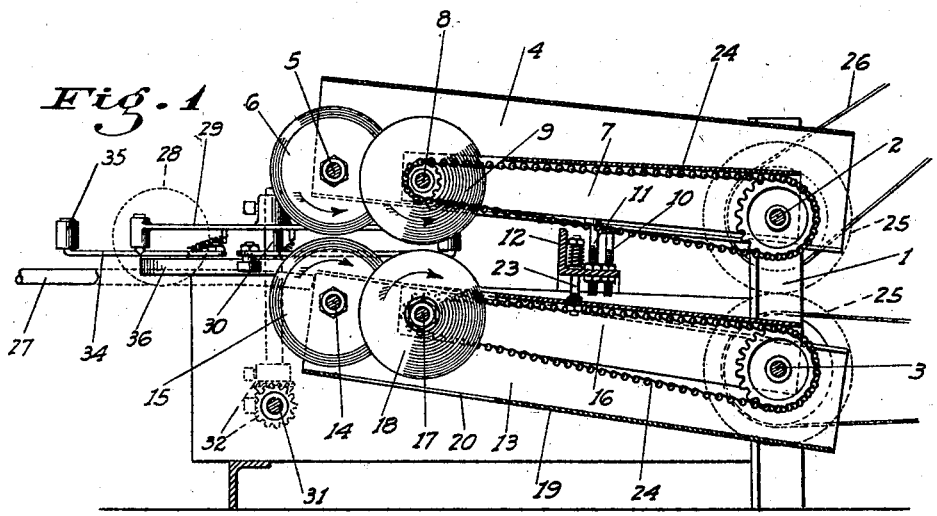
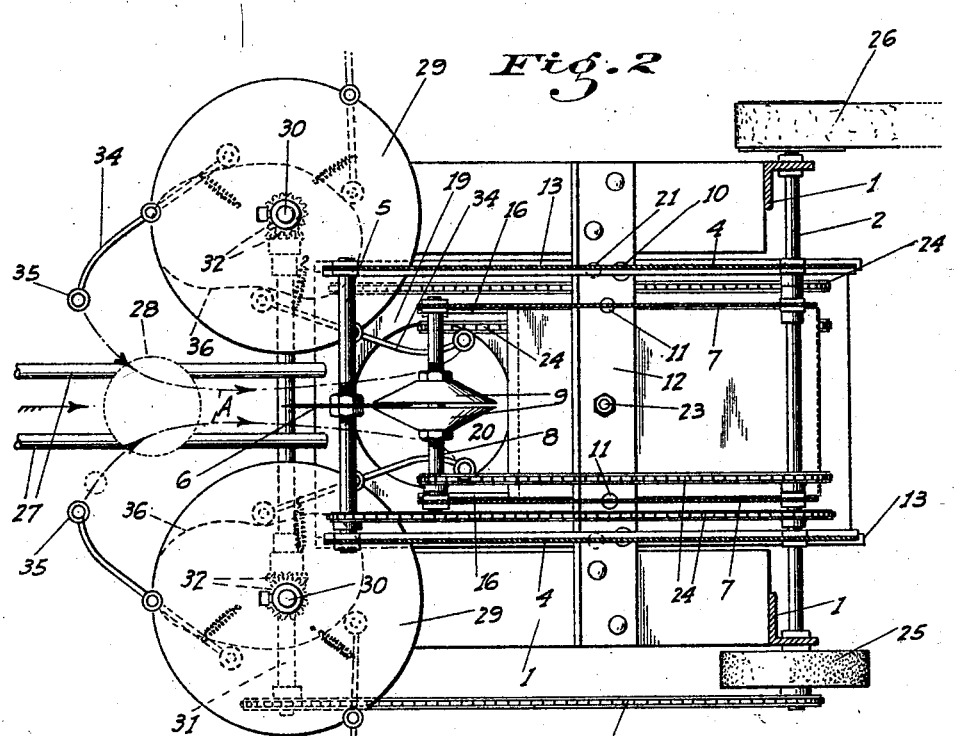
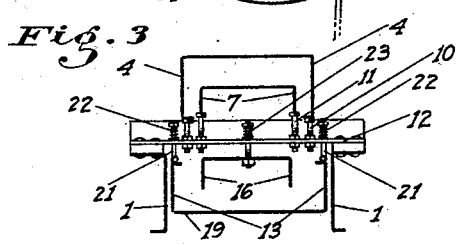
INVENTOR
John F. Roberts
BY
ATTORNEY Patented Feb. 3, 1925.

1,524,886

UNITED STATES PATENT OFFICE.

JOHN F. ROBERTS, OF STOCKTON, CALIFORNIA.

FRUIT CUTTER AND PITTER.

Application filed May 26, 1924. Serial No. 715,855.

*To all whom it may concern:*

Be it known that I, JOHN F. ROBERTS, a citizen of the United States, residing at Stockton, county of San Joaquin, State of California, have invented certain new and useful Improvements in Fruit Cutters and Pitters; and I do declare the following to be a full, clear, and exact description of the same, reference being had to the accompanying drawings, and to the characters of reference marked thereon, which form a part of this application.

This invention relates to improvements in fruit cutting and pitting machines, my principal object being to provide a device of this character, particularly intended for handling peaches, so constructed that the fruit will be cut, the halves separated, and the pit either removed or at least exposed, depending on whether free or cling stone varieties of peach are being handled.

A further object is to mount the fruit cutting and separating elements in such a manner that they will automatically adjust themselves to the size of fruit, and the pits thereof, being passed through the machine, so that fruit of all sizes may be handled without having to manually adjust the machine for each size.

I have also provided means for feeding the fruit one by one to the machine.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a sectional side elevation of the machine.

Fig. 2 is a top plan view of the same.

Fig. 3 is a fragmentary cross section on the line 3—3 of Fig. 1.

Referring now more particularly to the characters of reference on the drawings the numeral 1 denotes vertical and main supporting frame members, transversely spaced. Journaled in the frames at one end thereof in vertically spaced relation are upper and lower shafts 2 and 3 respectively.

Turnably mounted on the shaft 2 and extending forwardly thereof are horizontal arms 4, connected as a unit, and having mounted therein adjacent their forward ends a transverse shaft 5 carrying a cutting disc 6.

Similarly but independently mounted on the shaft 2 are arms 7, connected as a unit, substantially parallel to but shorter than the arms 4. Journaled adjacent the forward ends of these arms is a transverse shaft 8, fixed on which is a pair of frusto-conical discs 9, whose bases face each other but are spaced apart sufficiently to allow the disc 6 to project therebetween, as shown in Fig. 2.

The arms 4 and 7 are supported intermediate their ends independently of each other and in vertically adjustable relation by means of vertically adjustable stops 10 and 11 mounted in a rigid cross member 12 mounted on the frame 1, the arms 4 resting on the stops 10 and the arms 7 on the stops 11. Thus said arms are prevented from moving down below a certain level, but are free to move upwardly if their weight is overcome.

Turnable on the lower shaft 3 are arms 13, extending forwardly of said shaft and carrying adjacent their forward ends a transverse shaft 14 in vertical alinement with the shaft 6. Fixed on the shaft 14 is a cutting disc 15 of the same nature as the disc 6 and in transverse alinement therewith.

Arms 16 similar to the arms 7 but independent thereof and of the arms 13 are turnable on the shaft 3, said arms supporting a shaft 17 in vertical alinement with the shaft 8. The shaft 17 has fixed thereon a pair of frusto conical discs 18 of the same nature and disposed relative to each other in the same manner as the discs 9, the cutter 15 projecting between said discs 18.

A plate 19 extends between the arms 13 under the discs and has an orifice 20 to receive fruit therethrough, located under the discs 15 and 18.

The arms 13 are resiliently supported intermediate their ends by means of bolts 21 connected thereto and projecting up through the plate 12, springs 22 being about said bolts above the plate. A similar spring supported bolt 23 is mounted in the plate and is connected at its lower ends to the arm unit 16.

The shafts 5, 8, 14 and 17 are all connected in independent driving relation with the corresponding shafts 2 and 3 by means of chain drives 24 extending from the latter to the former shafts.

The shafts 2 and 3 are connected in driving relation with each other for rotation in opposite directions by suitable means, as for instance contacting friction pulleys 25 thereon. One of said shafts is adapted to be positively driven from a source of power by a belt drive connected thereto, as indicated at 26.

Arranged in transversely spaced relation to each other and extending parallel to the plane of the discs ahead of and centrally disposed relative to the same, are horizontal guide rods 27 for supporting the fruit 28 in single file order.

The fruit may be moved into engagement with the cutters by hand, but I prefer mechanical means to do this. Such means comprises a pair of horizontal disc-plates 29 fixed on vertical shafts 30 disposed on each side of the plane of the discs and about in transverse alinement with the forward edges of the same.

The shafts 30 are rotated in opposite directions from a transverse shaft 31 by means of suitable gearing 32 between the shafts, the shaft 31 being itself driven from either the shaft 2 or 3 by chain drive means 33 extending therebetween. Pivoted intermediate their ends on the plates 29 in evenly spaced relation about the periphery thereof are fingers 34 carrying at their outer ends upstanding pads 35 adapted to engage the fruit 28 on the guides 27. The opposite ends of the fingers engage stationary cams 36 mounted under the plates 28, said cams being so shaped that with the rotation of the plates the fingers will be turned so as to cause the pads thereon to first approach and bear against the fruit on the side thereof farthest from the discs, and will then push the fruit along toward and past said discs, the finger pads during this time remaining substantially parallel to each other until past the discs, when the pads again diverge from each other. The path of movement of the pads above described is shown by the lines A in Fig. 2, the result being that the fruit is forced in a straight line toward the discs.

If desired, the fingers may be arranged to pull instead of push the fruit toward the discs. The fingers are of course so disposed on the plates, and the latter connected in driving relation so that the fingers maintain a symmetrical alinement relative to each other at all times.

In operation, the fruit is first placed on the guides with its natural plane of cleavage in a vertical plane. The fingers engaging the fruit, force the same toward and against the cutting discs, which are revolving with their adjacent edges moving away from the fruit. The cutters cleave the fruit all around to the pit, the arms supporting the cutters automatically separating to allow the pit the pass therebetween.

The cut fruit is then immediately received by the separating discs, which causes the two halves to be spread away from each other, and usually separated from the pit. The pit, if not clinging to the fruit, will drop out in the area between the cutter and separator discs and said pit, as well as the halved fruit, will fall through the orifice 20 into any suitable form of receptacle thereunder.

It will be noted that by reason of the yieldable mounting of the various arms, it makes no difference how large or small the pit may be, and the cutter supporting arms being movable independently of the separating disc arms, each set of arms may separate as may be necessary, without interfering with the other set.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and desire to secure by Letters Patent is:

1. A fruit cutting and pitting machine including cooperating cutter discs for cutting the fruit in half around the pit, and conical discs whose bases face each other, associated in horizontal alinement with the cutting discs.

2. A fruit cutting and pitting machine including cooperating cutter discs for cutting the fruit in half around the pit, said discs lying in a common plane, and a pair of conical discs whose bases face each other associated with each cutter disc, the latter projecting between said conical discs.

3. A fruit cutting and pitting machine including cooperating cutter discs for cutting the fruit in half around the pit, said discs lying in a common vertical plane, separator-disc units in substantial horizontal alinement with the cutter discs, each such unit comprising a pair of conical discs whose bases face each other, and are spaced apart to allow the corresponding cutter disc to project therebetween.

4. A fruit cutting and pitting machine including cooperating cutter discs for cutting the fruit in half around the pit, said discs lying in a common plane, separator disc units to cooperate with the cutter discs and positioned to receive the fruit as it is cut by the said discs, supporting means for the cutter discs and separator units, each disc and unit being independently supported, said means being pivoted at one end and the discs and separators being mounted at the other end, and stop means applied to said means intermediate their ends for enabling the discs and separators to move relative to each other but preventing their approach beyond a predetermined extent.

5. A fruit cutting and pitting machine including cooperating cutter discs for cutting the fruit in half around the pit, supporting means for the fruit ahead of the cutters, and mechanical means for engaging the fruit on the supporting means and moving it into the plane of the cutters.

6. A fruit cutting and pitting machine including cooperating cutter discs for cutting the fruit in half around the pit, supporting means for the fruit ahead of the cutters, fingers adapted to engage the fruit on the face thereof opposite to the cutters, and means acting on the fingers to cause them to move the fruit in a straight line toward and into engagement with the cutters.

7. A fruit cutting and pitting machine including cooperating cutter discs, cooperating separator disc units arranged in connection with the cutter discs, means yieldably and independently supporting said cutter and separator discs in a manner to enable them to separate, and means for positively rotating all said discs irrespective of their positioning relative to each other.

8. A fruit cutting and pitting machine including cooperating cutter discs, supporting means for the fruit ahead of the cutters, fingers arranged to sweep across the supporting means, and disposed in horizontally opposed alinement to each other, said fingers being adapted to engage the fruit on the supporting means on the face of the fruit opposite to the cutters, means for rotating the fingers to move the fruit toward the cutters, and means whereby with such rotation, the adjacent ends of the fingers will remain in substantially the same spaced relation to each other for a predetermined extent of their travel and will then separate to first clear the cutter and then with a further rotation to pass behind and engage the next fruit on the supporting means.

9. A fruit cutting and pitting machine including cooperating cutter discs, supporting means for the fruit ahead of the cutters, fingers arranged to sweep across the supporting means, and disposed in horizontally opposed alinement to each other, said fingers being adapted to engage the fruit on the supporting means on the face of the fruit opposite to the cutters, means for rotating the fingers to move the fruit toward the cutters, and cam means acting on the fingers with such rotation to cause the fingers to engage the fruit for a certain period and then to move apart to clear the cutters after the fruit has been moved into the sphere of influence of the same.

In testimony whereof I affix my signature.

JOHN F. ROBERTS.